UNITED STATES PATENT OFFICE.

MARION DORSET, OF WASHINGTON, DISTRICT OF COLUMBIA, AND ROBERT R. HENLEY, OF TAKOMA PARK, MARYLAND.

PROCESS FOR REFINING DEFIBRINATED-BLOOD ANTITOXIN.

1,270,270. Specification of Letters Patent. Patented June 25, 1918.

No Drawing. Application filed February 27, 1918. Serial No. 219,524.

(DEDICATED TO THE PUBLIC.)

*To all whom it may concern:*

Be it known that we, MARION DORSET, a citizen of the United States, residing in Washington, District of Columbia, (whose post-office address is Department of Agriculture, Washington, D. C.,) and ROBERT R. HENLEY, a citizen of the United States, residing in Takoma Park, Maryland, (whose post-office address is Department of Agriculture, Washington, D. C.,) have invented a new and useful Process for Refining Defibrinated-Blood Antitoxin and Producing Therefrom a Clear, Concentrated, and Sterile Antitoxin.

This application is made under the act of March 3, 1883, chapter 143 (22 Stat., 625), and the invention hereindescribed and claimed may be used by the Government of the United States or any of its officers or employees in the prosecution of work for the Government, or any person in the United States, without payment to us of any royalty thereon.

Hog cholera defibrinated blood antitoxin is produced according to the process described in Letters Patent No. 823,110 granted to Marion Dorset. This defibrinated blood antitoxin contains the serum albumins and serum globulins with which latter the antitoxin is associated, and in addition it contains red blood cells, either intact or partly disintegrated, free hemoglobin and bacteria. It furthermore contains a preservative, usually phenol or cresol, which is added to the defibrinated blood antitoxin for purposes of preservation. At times it becomes desirable to refine, concentrate and sterilize this commercial defibrinated blood antitoxin. Up to the present time the only means for accomplishing this refinement, concentration and sterilization has been the employment of ammonium sulfate, which results in the precipitation of the globulins and antitoxin. The precipitated globulins and antibodies are later freed from the cell residues, with which they are mixed, by solution and filtration. The final product secured by the ammonium sulfate method consists only of the globulins and antibodies.

In the process which we have invented, ammonium sulfate is not employed at any stage and the final product produced consists of a mixture of serum globulins, serum albumins, an antibodies.

In applying our process we take a definite quantity of hog cholera defibrinated blood antitoxin containing phenol and add thereto one to three volumes of water. To this mixture of antitoxin and water, common table salt (sodium chlorid), is added in the proportion of 200 grams of salt to each 1,000 cubic centimeters of the mixture. The operation of the process is not dependent upon the addition of salt, but the presence of salt facilitates filtration, and we have preferred, accordingly, to use it. After addition and solution of the salt, the mixture is heated in a water bath to elevated temperatures for definite periods of time, depending upon the temperature employed. We prefer to heat to 58°–60° C. for 30 minutes. The temperature must be high enough to cause coagulation of the hemoglobin but not high enough to coagulate albumins or globulins. In order to secure more rapid and complete coagulation of the hemoglobin, a current of air is passed through the mixture while it is being heated. After heating, the mixture is cooled and the coagulated hemoglobin, cell residues and bacteria are separated from the uncoagulated solution of serum albumins, globulins and antibodies by filtration. The coagulated mass of hemoglobin, cell residues and bacteria is washed with a solution of sodium chlorid and finally pressed to remove any of the albumins, globulins and antibodies that may be mechanically held in the coagulated mass. After washing the coagulated hemoglobin, cell residues and bacteria are discarded. To the combined filtrates obtained as described above, acetic acid is added in order to precipitate all of the serum globulins, serum albumins and antitoxin. Three cubic centimeters of pure acetic acid to each 1,000 cubic centimeters of solution is usually sufficient. The precipitate caused by the acid is separated by filtration, and the filtrate is discarded. The precipitate of serum albumins, globulins and antibodies is dried, and then dissolved in the desired amount of water, using small quantities of sodium carbonate solution or other suitable alkali, to neutralize any acid that may remain. If sterile water and sterile containers are used in preparing this final solution, the end product will be in sterile form. An antiseptic, such as phenol, is added to preserve the solution. The solution may be filtered if necessary. The foregoing process may be applied to the blood of animals other than hogs.

Having described our invention we claim,

1. In the art of preparing sterile hog cholera serum antitoxin the step comprising the heating and aerating of hog cholera defibrinated blood antitoxin in mixture with salt and water in order to coagulate and precipitate the hemoglobin, cell residues and bacteria without coagulating or in any wise injuring the hog cholera serum globulins, serum albumins and antitoxin, and thereupon permitting the separation of the uncoagulated hog cholera serum globulins, serum albumins and antibodies from the coagulated hemoglobin, cell residues and bacteria.

2. In the art of preparing sterile hog cholera serum antitoxin, the step comprising the heating and aerating of phenolized hog cholera defibrinated blood antitoxin diluted with water in order to coagulate and precipitate the hemoglobin, cell residues and bacteria without coagulating or in any wise injuring the hog cholera serum globulin, serum albumins or antibodies, and thereupon permitting the separation of the uncoagulated hog cholera serum globulins, serum albumins and antibodies from the coagulated hemoglobin, cell residues and bacteria.

3. The process of eliminating from defibrinated blood antitoxin, the hemoglobin, cell residues and bacteria, by coagulation of the hemoglobin with heat, and removal of the coagulated hemoglobin, the cell residues and the bacteria by filtration, without injury to the serum albumins, serum globulins and antibodies, followed by precipitation of the serum globulins, serum albumins and antibodies by acids and removal by filtration and by solution and neutralization of the precipitate, thereby obtaining a refined, concentrated and sterile antitoxin.

4. As a new product, a sterile solution of hog cholera serum albumins, globulins and antibodies removed by heat and filtration, and by acidification and filtration from the inert hemoglobin cell residues and harmful bacteria of phenolized hog cholera defibrinated blood antitoxin.

In testimony whereof, we affix our signatures in the presence of two subscribing witnesses.

MARION DORSET.
ROBERT R. HENLEY.

Witnesses:
C. N. McBryde,
W. S. Stamper.